(12) United States Patent
Kabeya et al.

(10) Patent No.: US 10,777,963 B2
(45) Date of Patent: Sep. 15, 2020

(54) LASER DEVICE

(71) Applicant: HAMAMATSU PHOTONICS K.K., Hamamatsu-shi, Shizuoka (JP)

(72) Inventors: Yuki Kabeya, Hamamatsu (JP); Takashi Sekine, Hamamatsu (JP); Yoshinori Kato, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/423,387

(22) Filed: May 28, 2019

(65) Prior Publication Data
US 2019/0372299 A1 Dec. 5, 2019

(30) Foreign Application Priority Data
May 30, 2018 (JP) .................................. 2018-103964

(51) Int. Cl.
| | | |
|---|---|---|
| *H01S 3/23* | (2006.01) | |
| *H01S 3/10* | (2006.01) | |
| *H01S 3/00* | (2006.01) | |
| *H01S 3/06* | (2006.01) | |
| *H01S 3/16* | (2006.01) | |
| *H01S 3/0941* | (2006.01) | |

(52) U.S. Cl.
CPC ............ *H01S 3/2325* (2013.01); *H01S 3/005* (2013.01); *H01S 3/10* (2013.01); *H01S 3/2308* (2013.01); *H01S 3/0071* (2013.01); *H01S 3/0604* (2013.01); *H01S 3/0621* (2013.01); *H01S 3/09415* (2013.01); *H01S 3/1618* (2013.01); *H01S 3/1643* (2013.01); *H01S 3/2316* (2013.01)

(58) Field of Classification Search
CPC ........ H01S 3/10; H01S 3/2308; H01S 3/2325; H01S 3/005; H01S 3/16; H01S 3/06; H01S 3/0941; H01S 3/0621; H01S 3/2316; H01S 3/1643; H01S 3/1618; H01S 3/09415; H01S 3/0604; H01S 3/0071; H01S 3/00; H01S 3/23
See application file for complete search history.

(56) References Cited

U.S. PATENT DOCUMENTS

| | | | | |
|---|---|---|---|---|
| 7,386,019 B2* | 6/2008 | Klimov | ............... | H01S 3/09415 372/18 |
| 2003/0189711 A1* | 10/2003 | Orr | .......................... | G01J 3/42 356/484 |
| 2006/0262815 A1 | 11/2006 | Klimov et al. | | |

(Continued)

FOREIGN PATENT DOCUMENTS

| | | |
|---|---|---|
| EP | 0821453 A2 | 1/1998 |
| JP | 2005-327857 A | 11/2005 |

(Continued)

*Primary Examiner* — Xinning(Tom) Niu
(74) *Attorney, Agent, or Firm* — Faegre Drinker Biddle & Reath LLP

(57) ABSTRACT

A laser device includes a laser medium for amplifying seed light, a first optical system for outputting excitation light for exciting the laser medium and causing the excitation light to be incident on the laser medium and input to an excitation region of the laser medium, and a second optical system for causing the seed light of first polarization to be incident on the laser medium at an incidence angle larger than 0° with respect to the laser medium and input to the excitation region.

7 Claims, 5 Drawing Sheets

(56) References Cited

U.S. PATENT DOCUMENTS

2009/0245304 A1* 10/2009 Peng ............... H01S 3/2333
　　　　　　　　　　　　　　　　　　　　 372/29.02
2014/0056321 A1　　2/2014　Peng
2015/0249315 A1　　9/2015　Uefling et al.

FOREIGN PATENT DOCUMENTS

JP　　　2014-167989 A　　9/2014
WO　　WO 01/003260 A1　　1/2001

* cited by examiner

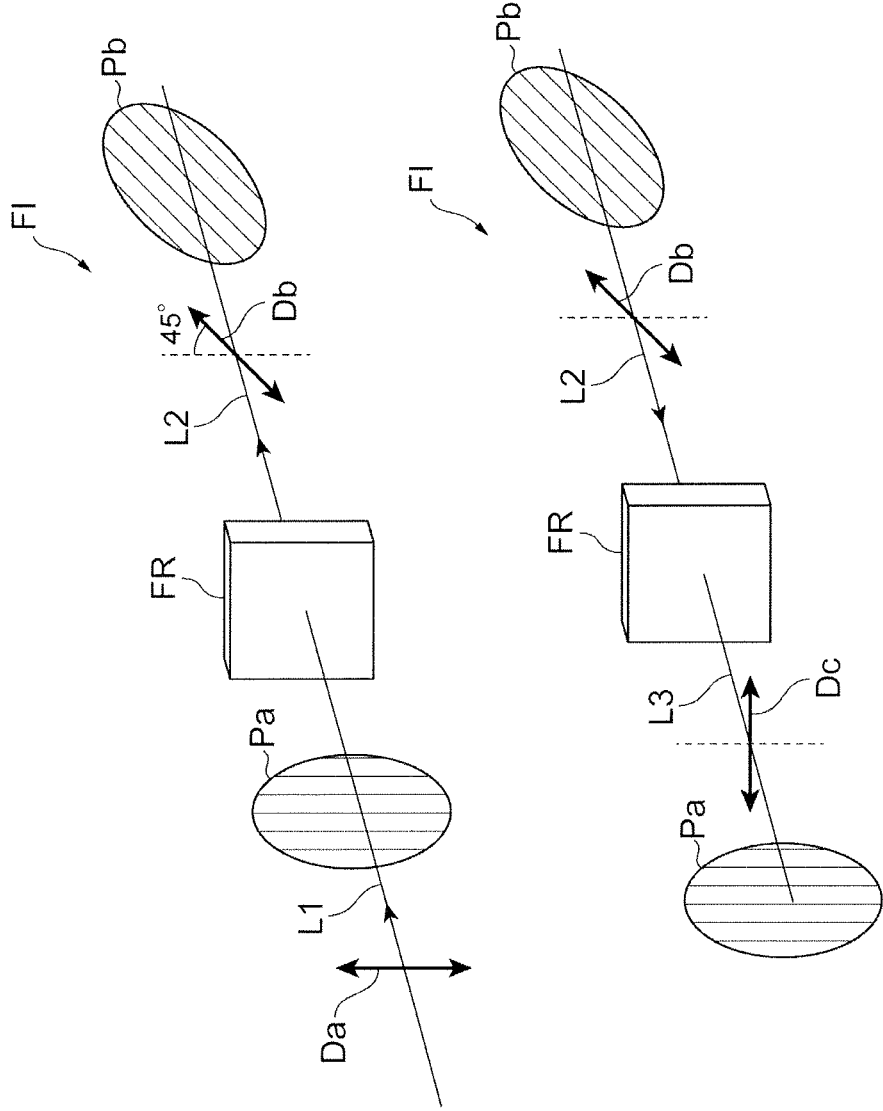

LASER DEVICE

TECHNICAL FIELD

The present disclosure relates to a laser device.

BACKGROUND

A laser device is described in Japanese Unexamined Patent Publication No. 2005-327857. This laser device includes a resonance type laser amplifier, and a path type laser light amplifier (multipath amplifier) for further amplifying laser light amplified by the resonance type laser amplifier. The path type laser light amplifier includes a laser medium and six reflective plates that form optical paths of laser light. The optical paths formed by the reflective plates are all configured to pass through the laser medium. Laser light from the resonance type laser amplifier is reflected by reflective plates one after another such that the laser light passes through a number of optical paths and is output. The laser light passes through the laser medium each time the laser light passes through these optical paths. The laser light is amplified each time the laser light passes through the laser medium.

SUMMARY

Incidentally, since laser devices that output much pulse energy are large and expensive and have a low repetition rate, industrial development is difficult. In recent years, various solid-state laser devices that are small and have a high repetition rate have been developed with high output of the semiconductor lasers. Among these laser devices, Yb-based lasers are expected to have a high output with a smaller number of semiconductor lasers than in Nd-based lasers. However, since Yb-based lasers are three-level lasers, special measures different from those for Nd-based lasers may be required, such as achievement of low doped ion concentration, high intensity excitation, and low temperature.

On the other hand, according to a multipath scheme, as in a laser device described in Japanese Unexamined Patent Publication No. 2005-327857, it can be conceived that it may be possible to achieve high output by realizing a low doped ion concentration and high intensity excitation, but a complex optical system is required as described above. In addition, it is difficult to put the device into practical use because the entire device becomes large in order to achieve a low temperature.

An object of the present disclosure is to provide a laser device capable of achieving high output with a simple configuration.

A laser device includes a laser medium for amplifying seed light; a first optical system for outputting excitation light for exciting the laser medium and causing the excitation light to be incident on the laser medium and input to an excitation region of the laser medium; and a second optical system for causing the seed light of a first polarization to be incident on the laser medium at an incidence angle larger than 0° with respect to the laser medium and input to the excitation region, wherein the second optical system includes a first beam splitter that passes the seed light of the first polarization so that the seed light is directed to the laser medium and reflects the seed light of second polarization different from the first polarization from the laser medium; a first phase shift element that is disposed between the first beam splitter and the laser medium and applies a phase difference of a ¼ wavelength to a polarization component of the seed light; a first mirror that reflects the seed light incident on the laser medium through the first phase shift element so that the seed light is emitted from the laser medium; and a second mirror that directs the seed light to the first beam splitter through the first phase shift element by causing the seed light to reflect again by the first mirror by reflecting the seed light so that the seed light returns to the first mirror through the laser medium.

In this laser device, the seed light that is an amplification target is input to the first beam splitter in the first polarization (for example, P polarization). The seed light of the first polarization passes through the first beam splitter and is directed to the laser medium. The seed light of the first polarization directed from the first beam splitter to the laser medium passes through the first phase shift element, such that a phase difference of a ¼ wavelength is applied to a polarization component thereof. The seed light passing through the first phase shift element is incident on the laser medium at an incidence angle larger than 0°. The seed light incident on the laser medium is input to the excitation region, amplified, reflected by the first mirror, amplified again, and then emitted from the laser medium. The seed light emitted from the laser medium is reflected by the second mirror and incident on the laser medium again. The seed light reflected by the second mirror and incident on the laser medium is reflected again by the first mirror and directed to the first beam splitter through the first phase shift element.

In this time, the seed light passes through the first phase shift element again, and then a phase difference of a ¼ wavelength is further applied to the polarization component thereof, and the seed light is caused to be the second polarization (for example, S polarization). Therefore, the seed light is reflected and split by the first beam splitter and split. The seed light split by the first beam splitter, for example, may be guided to the laser medium by another optical system again and subjected to further amplification. Thus, in the laser device, both of separation of an amplification path according to a polarization direction by the first beam splitter and the first phase shift element and doubling of an amplification path by the first mirror and the second mirror are achieved. As a result, it is possible to achieve high output by realizing a large number of amplifications with a simple configuration. It should be noted that the first beam splitter is a polarization beam splitter.

The laser device may include a third optical system for causing the seed light of the second polarization reflected by the first beam splitter to be incident on the laser medium and input to the excitation region, wherein the third optical system may include a second beam splitter that reflects the seed light of the second polarization from the first beam splitter so that the seed light is directed to the laser medium, and passes the seed light of the first polarization from the laser medium; a second phase shift element that is disposed between the second beam splitter and the laser medium and applies a phase difference of a ¼ wavelength to a polarization component of the seed light; and a third mirror that reflects the seed light incident on the laser medium through the second phase shift element so that the seed light is directed to the second beam splitter through the second phase shift element.

In this case, the seed light split by the first beam splitter is input to the second beam splitter. The seed light of the second polarization input to the second beam splitter is reflected by the second beam splitter so that the seed light is directed to the laser medium. The seed light of the second polarization directed to the laser medium from the second beam splitter passes through the second phase shift element, such that a phase difference of a ¼ wavelength is applied to a polarization component thereof. The seed light passing through the second phase shift element is input to the excitation region of the laser medium, is amplified, is reflected by the third mirror, is amplified again, passes through the second phase shift element again, and then, is input to the second beam splitter.

In this case, the seed light passes through the second phase shift element again, such that a phase difference of a ¼ wavelength is further applied to the polarization component thereof, and the seed light gains the first polarization. Therefore, the seed light passes through the second beam splitter. As a result, the seed light passing through the second beam splitter is amplified at least six times and output. Thus, in the laser device, it is possible to achieve high output by realizing a larger number of amplifications with a simple configuration. It should be noted that the second beam splitter is a polarization beam splitter.

The laser device may include an optical isolator that is disposed between the first beam splitter and the second beam splitter and passes light in a direction directed from the first beam splitter to the second beam splitter. In this case, progress of the light in the direction directed from the second beam splitter to the first beam splitter is suppressed. As a result, unintended resonator configuration and stimulated radiation are avoided. It should be noted that, in the laser device, seed light reciprocates in paths from the first beam splitter to the laser medium and from the second beam splitter to the laser medium. Therefore, as in this case, it is effective to interpose the optical isolator between the first beam splitter and the second beam splitter in which the reciprocation of the seed light is not required. It should be noted that the optical isolator may include a Faraday isolator.

In the laser device, the laser medium may include a first surface, and a second surface opposite to the first surface, the first optical system may cause the excitation light to be incident on the laser medium from the first surface side, and the second optical system may cause the seed light to be incident on the laser medium from the second surface side. In this case, an optical path of the excitation light and an optical path of the seed light are distributed to both sides of the laser medium. Therefore, it is possible to design an optical system without considering interference between the respective optical paths.

In the laser device, a coat that transmits the excitation light and reflects the seed light may be formed on the first surface, and the first mirror may include a mirror constituted by the coat. In this case, it is possible to achieve higher output with a simpler configuration.

In the laser device, the laser medium may include Yb as an active element. Thus, when the Yb-based laser medium is used, it is necessary for excitation light and seed light to be input to a narrower excitation region for high intensity excitation, for example, as compared with a case in which a Nd-based laser medium is used. Therefore, an importance of high-precision and easy alignment of the optical system is relatively higher. Therefore, it is more effective to realize a simple configuration using this laser device.

A laser device includes: a laser medium for amplifying seed light; a first optical system for outputting excitation light for exciting the laser medium and causing the excitation light to be incident on the laser medium and input to an excitation region of the laser medium; and a second optical system for causing the seed light of first polarization to be incident on the laser medium at an incidence angle larger than 0° with respect to the laser medium and input to the excitation region, wherein the second optical system includes a first beam splitter that passes the seed light of the first polarization so that the seed light is directed to the laser medium and reflects the seed light of second polarization different by 90° from the first polarization from the laser medium; a Faraday rotator that is disposed between the first beam splitter and the laser medium and rotates a polarization direction of the seed light by 45°; a first mirror that reflects the seed light incident on the laser medium through the Faraday rotator so that the seed light is emitted from the laser medium; and a second mirror that directs the seed light to the first beam splitter through the Faraday rotator by causing the seed light to reflect again by the first mirror by reflecting the seed light so that the seed light returns to the first mirror through the laser medium.

In this laser device, it is possible to achieve high output by realizing a large number of amplifications with a simple configuration, as in the laser device described above. In particular, in this laser device, a Faraday rotator is used as the polarization rotation element. Therefore, it is possible to compensate for a variation in the polarization direction due to heat generated in the laser medium.

According to the present disclosure, it is possible to provide a laser device capable of achieving high output with a simple configuration.

BRIEF DESCRIPTION OF THE DRAWINGS

FIG. 5A is a diagram illustrating an example of a Faraday isolator.

FIG. 5B is a diagram illustrating an example of a Faraday isolator.

DETAILED DESCRIPTION

Figure 1:
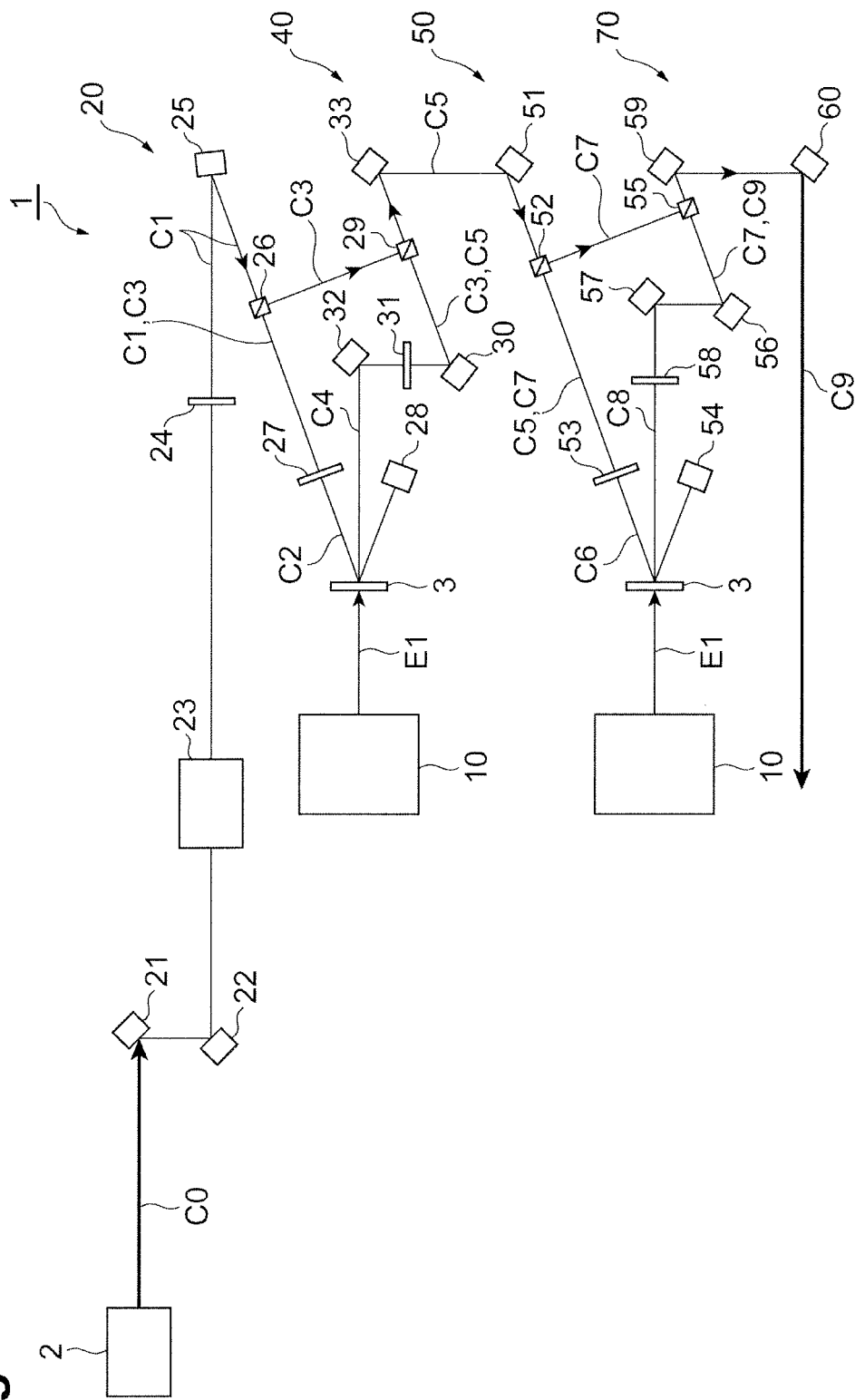
FIG. 1 is a schematic diagram illustrating an entire configuration of a laser device according to an embodiment of the present invention.

Hereinafter, an embodiment will be described in detail with reference to the drawings. In the drawings, the same elements or corresponding elements may be denoted by the same reference numerals, and redundant description may be omitted.

FIG. 1 is a schematic diagram illustrating an entire configuration of a laser device according to the embodiment. As illustrated in FIG. 1, the laser device 1 includes a two-stage amplification mechanism. The laser device 1 includes a light source 2, a laser medium 3, a first optical system 10, a second optical system 20, and a third optical system 40 as a first-stage amplification mechanism. The light source 2 outputs seed light (seed light C0). The seed light is, for example, laser light having a wavelength of about 1030 nm. The laser medium 3 amplifies the seed light. The laser medium 3 is, for example, a laser gain medium including Yb as an active element (for example, Yb: YAG).

The first optical system 10 outputs excitation light E1 for exciting the laser medium 3 and inputs the excitation light E1 to an excitation region R to be described below by causing the excitation light E1 to be incident on the laser medium 3. A wavelength of the excitation light E1 is different from the wavelength of the seed light. The excitation light E1 is, for example, laser light having a wavelength of about 940 nm. The second optical system 20 guides the seed light from the light source 2 and inputs the seed light to the excitation region R of the laser medium 3.

Figure 2:
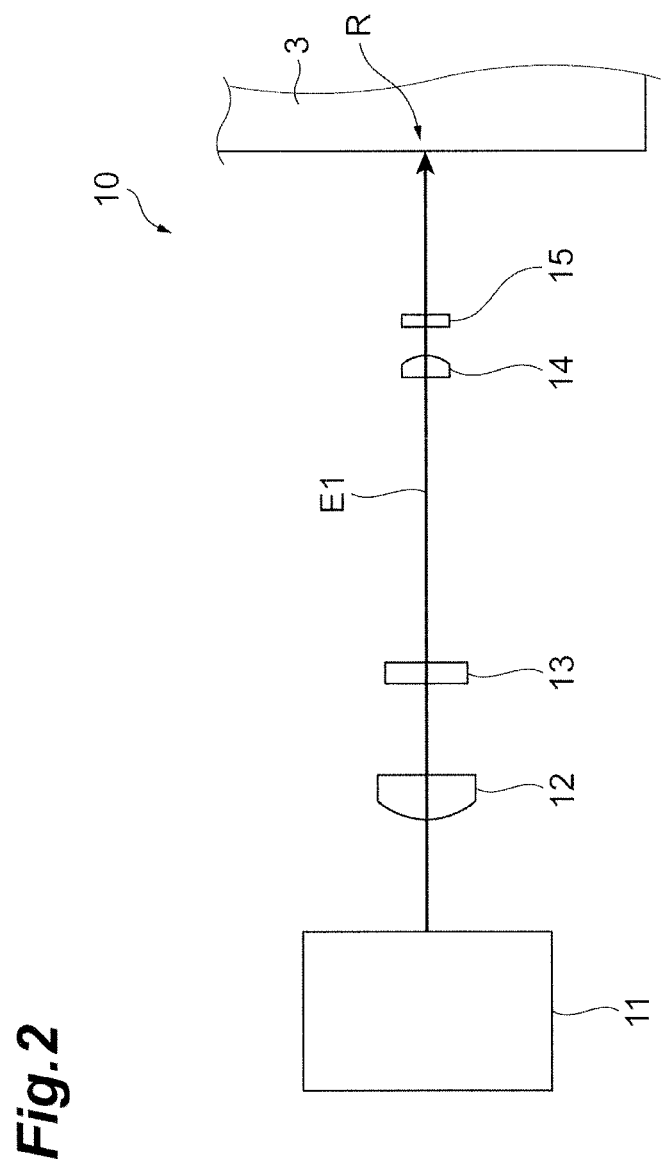
FIG. 2 is a schematic diagram illustrating a first optical system illustrated in FIG. 1.

FIG. 2 is a schematic diagram illustrating the first optical system illustrated in FIG. 1. As illustrated in FIG. 2, the first optical system 10 has an excitation light source 11 and lenses 12, 13, 14 and 15. The excitation light source 11 outputs the excitation light E1. The excitation light source 11 is, for example, a semiconductor laser device. As an example, the excitation light source 11 can be constituted by a semiconductor laser array. The lenses 12 to 15 condense the excitation light E1 output from the excitation light source 11 on the excitation region R. The lenses 12 to 15 are, for example, cylindrical lenses. The lenses 12 to 15 are arranged in order from the excitation light source 11 to the laser medium 3.

The lens 12 collimates the excitation light E1 output from the excitation light source 11 in a fast axis direction. The lens 13 collimates the excitation light E1 from the lens 12 in a slow axis direction. The lens 14 condenses the excitation light E1 from the lens 13 in the fast axis direction. The lens 15 condenses the excitation light E1 from the lens 14 in the slow axis direction. Accordingly, the excitation light E1 is condensed in both the fast axis direction and the slow axis direction and input to the excitation region R of the laser medium 3.

Figure 3:
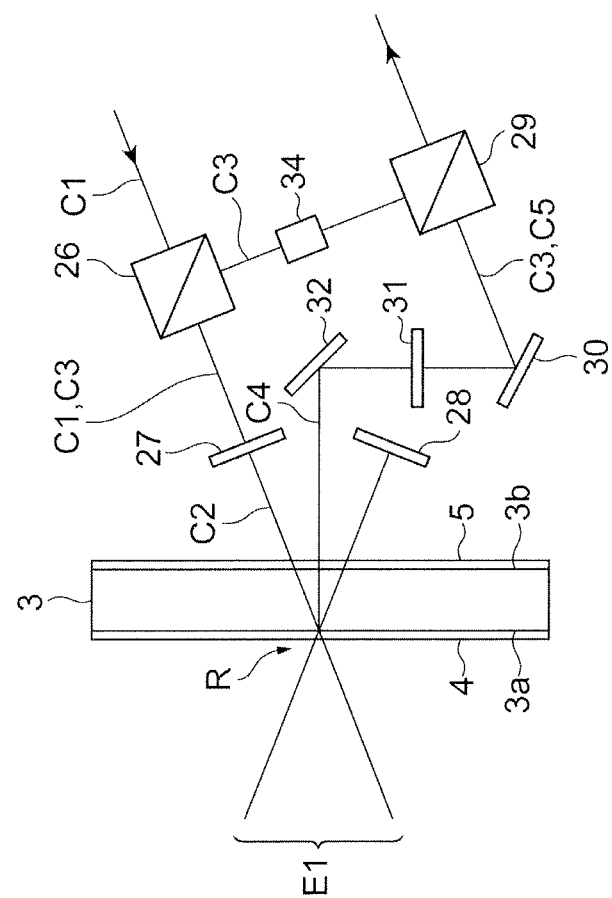
FIG. 3 is a schematic diagram illustrating enlarged main parts of FIG. 1.

FIG. 3 is a schematic diagram illustrating enlarged main parts of FIG. 1. As illustrated in FIGS. 1 to 3, the laser medium 3 is formed, for example, in a flat plate shape. The laser medium 3 has a first surface 3a and a second surface 3b opposite to the first surface 3a. The first surface 3a and the second surface 3b are, for example, parallel to each other. The first optical system 10 is disposed on the first surface 3a side, and inputs the excitation light E 1 to the excitation region R by causing the excitation light E 1 to be incident on the laser medium 3 from the first surface 3a side. Main configurations of the second optical system 20 and the third optical system 40 are disposed on the second surface 3b side. The second optical system 20 and the third optical system 40 input the seed light to the excitation region R by causing the seed light to be incident on the laser medium 3 from the second surface 3b side.

A coat (a first mirror or a third mirror) 4 is formed on the first surface 3a, and a coat 5 is formed on the second surface 3b. The coats 4 and 5 are, for example, dielectric multilayer films. The coat 4 includes a non-reflective coat for the wavelength of the excitation light E1 and a reflective coat for the wavelength of the seed light. That is, the coat 4 transmits the excitation light E1 and reflects the seed light. The coat 5 includes a reflective coat for the wavelength of the excitation light E1 and a non-reflective coat for the wavelength of the seed light. That is, the coat 5 reflects the excitation light E1 and transmits the seed light.

The second optical system 20 includes mirrors 21 and 22, an optical isolator 23, a phase shift element 24, a mirror 25, a first beam splitter 26, a first phase shift element 27, and a mirror (a second mirror) 28. The third optical system 40 includes a second beam splitter 29, a mirror (a third mirror) 30, a second phase shift element 31, a mirror (a third mirror) 32, a mirror 33, and an optical isolator 34. It should be noted that the first beam splitter 26 and the second beam splitter 29 are polarization beam splitters, and the first phase shift element 27 and the second phase shift element 31 are, for example, wavelength plates (here, λ/4 wavelength plates).

The mirrors 21 and 22 guide the seed light C0 output from the light source 2 by reflecting the seed light C0 and input the seed light C0 to the optical isolator 23. The optical isolator 23 prevents return light. The phase shift element 24 receives the seed light C0 output from the optical isolator 23. The phase shift element 24 applies a phase difference to polarization components of the seed light C0, and outputs resultant light as seed light C1 of the first polarization (for example, P polarization). The mirror 25 reflects the seed light C1 of the first polarization output from the phase shift element 24 and inputs the seed light C1 to the first beam splitter 26.

The first beam splitter 26 has a function of passing the seed light of the first polarization toward the laser medium 3 and reflecting the seed light of the first polarization so that seed light of second polarization (for example, S polarization) different from the first polarization by 90° is directed to the second beam splitter 29. Therefore, the first beam splitter 26 passes, toward the laser medium 3, the seed light C1 that has been converted into the first polarization by the phase shift element 24 and guided by the mirror 25.

The first phase shift element 27 is disposed between the first beam splitter 26 and the laser medium 3. The first phase shift element 27 has a function of applying a phase difference of a ¼ wavelength to a polarization component of light. Therefore, here, the first phase shift element 27 receives the seed light C1 from the first beam splitter 26, applies a phase difference of a ¼ wavelength to a polarization component thereof, and outputs the resultant light as the seed light C2. The seed light C2 output from the first phase shift element 27 is input to the laser medium 3 (the excitation region R) and subjected to amplification in the laser medium 3. Here, the seed light C2 is obliquely incident at an incidence angle (for example, about 30°) larger than 0° with respect to the first surface 3a of the laser medium 3.

The coat 4 reflects the seed light C2 incident on the laser medium 3 through the first phase shift element 27 and traveling in the laser medium 3 so that the seed light C2 travels in the laser medium 3 again and is emitted from the laser medium 3. Here, the coat 4 obliquely emits the seed light C2 at an angle corresponding to the incidence angle to the laser medium 3. The mirror 28 reflects the seed light C2 reflected by the coat 4, and causes the seed light C2 to return to the coat 4. A reflective surface of the mirror 28 is orthogonal to the seed light C2 (the mirror 28 is a 0° mirror). Therefore, the seed light C2 reflected by the mirror 28 returns to the laser medium 3 through an optical path from the coat 4 to the mirror 28 in a reverse direction. Further, the seed light C2 returned to the laser medium 3 is reflected again by the coat 4 and directed to the first phase shift element 27 and the first beam splitter 26. That is, the mirror 28 reflects the seed light C2 reflected by the coat 4 so that the seed light C2 returns to the coat 4 through the laser medium 3, thereby reflecting the seed light C2 so that the seed light C2 is directed to the first beam splitter 26 through the first phase shift element 27. Accordingly, the seed light C2 passes through the laser medium 3 (the excitation region R) four times and is amplified.

The first phase shift element 27 is interposed between the laser medium 3 and the first beam splitter 26. Therefore, the first phase shift element 27 receives the amplified seed light C2 reflected by the coat 4 and the mirror 28, applies a phase difference of a ¼ wavelength to the polarization component thereof, and outputs the resultant light as seed light C3. A polarization direction of the seed light C3 output from the first phase shift element 27 is rotated by 90° due to shift by a ½ wavelength of a phase of the polarization component, as compared with the seed light C1, such that the seed light C3 gains the second polarization. The seed light C3 output from the first phase shift element 27 is input to the first beam splitter 26.

As described above, the first beam splitter 26 has a function of reflecting the seed light of the second polarization so that the seed light is directed to the second beam splitter 29. Therefore, the first beam splitter 26 reflects the seed light C3 of the second polarization toward the second beam splitter 29. The second beam splitter 29 has a function of reflecting the seed light of the second polarization toward the laser medium 3 and transmitting the seed light of the first polarization. Therefore, the second beam splitter 29 reflects the seed light C3 of the second polarization from the first beam splitter 26 so that the seed light C3 is directed to the laser medium 3. Here, the second beam splitter 29 reflects the seed light C3 toward the mirror 30. The mirror 30 reflects the seed light C3 from the second beam splitter 29 toward the mirror 32. The mirror 32 reflects the seed light C3 from the mirror 30 toward the laser medium 3.

The second phase shift element 31 has a function of applying a phase difference of a ¼ wavelength to a polarization component of light. The second phase shift element 31 is disposed between the mirror 30 and the mirror 32, that is, between the second beam splitter 29 and the laser medium 3. Therefore, the second phase shift element 31 receives the seed light C3 from the second beam splitter 29 through the mirror 30, applies a phase difference of a ¼ wavelength to a polarization component thereof, and outputs the resultant light as seed light C4. The seed light C4 output from the second phase shift element 31 is reflected by the mirror 32 and input to the laser medium 3. Here, the seed light C4 is incident at an incidence angle of 0° with respect to the first surface 3a of the laser medium 3.

The coat 4 reflects the seed light C4 incident on the laser medium 3 toward the mirror 32. A reflective surface of the coat 4 is orthogonal to the seed light C4 (the coat 4 is a 0° mirror with respect to the seed light C4). Therefore, the seed light C4 reflected by the coat 4 is directed to the mirrors 32 and 30, the second phase shift element 31, and the second beam splitter 29 in a reverse direction of an optical path directed from the mirror 32 to the coat 4. That is, the coat 4 and the mirrors 32 and 30 reflect the seed light C4 input to the laser medium 3 through the second phase shift element 31 so that the seed light C4 is directed to the second beam splitter 29 through the second phase shift element 31. Accordingly, the seed light C4 passes through the laser medium 3 (the excitation region R) twice and is amplified.

The second phase shift element 31 is interposed between the mirror 32 and the mirror 30. Therefore, the second phase shift element 31 receives the amplified seed light C4 reflected by the coat 4, applies a phase difference of a ¼ wavelength to a polarization component thereof, and outputs the resultant light as seed light C5. A polarization direction of the seed light C5 output from the second phase shift element 31 is rotated by 90° due to shift by a ½ wavelength of a phase of the polarization component, as compared with the seed light C3, and the seed light C5 gains first polarization. The seed light C5 output from the second phase shift element 31 is input to the second beam splitter 29 through the mirror 30.

As described above, the second beam splitter 29 has a function of passing the seed light of the first polarization. Therefore, the second beam splitter 29 passes the seed light C5 of the first polarization from the mirror 30. The seed light C5 passing through the second beam splitter 29 is reflected by the mirror 33 and then subjected to a second-stage amplification mechanism. As described above, in the laser device 1, six paths passing through the laser medium 3 are formed in the first-stage amplification mechanism, and the seed light is amplified six times.

As illustrated in FIG. 3, in the laser device 1, the optical isolator 34 is disposed between the first beam splitter 26 and the second beam splitter 29. The optical isolator 34 passes light only in a direction from the first beam splitter 26 to the second beam splitter 29, and prevents light from being passed in a reverse direction.

Here, the laser device 1 further includes, as a second-stage amplification mechanism, a configuration that is substantially the same as the first-stage amplification mechanism. That is, the laser device 1 includes a mirror 51, a laser medium 3, a first optical system 10, a second optical system 50, and a third optical system 70, as the second-stage amplification mechanism. The seed light C5 from the first-stage amplification mechanism is reflected by the mirror 51 and introduced into the second optical system 50.

The second optical system 50 includes a first beam splitter 52, a first phase shift element 53, and a mirror (a second mirror) 54. The third optical system 70 includes a second beam splitter 55, a mirror (a third mirror) 56, a second phase shift element 58, a mirror (a third mirror) 57, a mirror 59, and an optical isolator (not illustrated). It should be noted that the first beam splitter 52 and the second beam splitter 55 are polarization beam splitters, and the first phase shift element 53 and the second phase shift element 58 are, for example, wavelength plates (here, λ/4 wavelength plates).

The first beam splitter 52 has a function of passing the seed light of the first polarization so that the seed light is directed to the laser medium 3, and reflecting the seed light of the second polarization different by 90° from the first polarization so that the seed light is directed to the second beam splitter. Therefore, the first beam splitter 52 passes the seed light C5 of the first polarization guided by the mirror 51 toward the laser medium 3.

The first phase shift element 53 is disposed between the first beam splitter 52 and the laser medium 3. The first phase shift element 53 has a function of applying a phase difference of a ¼ wavelength to a polarization component of light. Therefore, here, the first phase shift element 53 receives the seed light C5 from the first beam splitter 52, applies a phase difference of a ¼ wavelength to a polarization component thereof, and outputs the resultant light as seed light C6. The seed light C6 output from the first phase shift element 53 is input to the laser medium 3 (the excitation region R) and subjected to amplification in the laser medium 3. Here, the seed light C6 is obliquely incident at an incidence angle (for example, about 30°) larger than 0° with respect to the first surface 3a of the laser medium 3.

The coat 4 reflects the seed light C6 incident on the laser medium 3 through the first phase shift element 53 and traveling in the laser medium 3 so that the seed light C6 travels in the laser medium 3 again and is emitted from the laser medium 3. Here, the coat 4 obliquely emits the seed light C6 at an angle according to an angle of incidence on the laser medium 3. The mirror 54 reflects the seed light C6 reflected by the coat 4 and causes the seed light C6 to return to the coat 4. A reflection surface of the mirror 54 is orthogonal to the seed light C6 (the mirror 54 is a 0° mirror). Therefore, the seed light C6 reflected by the mirror 54 returns to the laser medium 3 in a reverse direction of an optical path directed from the coat 4 to the mirror 54. Further, the seed light C2 returned to the laser medium 3 is reflected again by the coat 4 and directed to the first phase shift element 53 and the first beam splitter 52. That is, the mirror 54 reflects the seed light C2 reflected by the coat 4 so that the seed light C2 returns to the coat 4 through the laser medium 3 and is directed to the first beam splitter 52 through the first phase shift element 53. Accordingly, the seed light C6 passes through the laser medium 3 (the excitation region R) four times and is amplified.

The first phase shift element 53 is interposed between the laser medium 3 and the first beam splitter 52. Therefore, the first phase shift element 53 receives the amplified seed light C6 reflected by the coat 4 and the mirror 54, applies a phase difference of a ¼ wavelength to a polarization component thereof, and outputs the resultant light as seed light C7. A polarization direction of the seed light C7 output from the first phase shift element 53 is rotated by 90° due to shift by a ½ wavelength of a phase of the polarization component, as compared with the seed light C5, and the seed light C7 gains the second polarization. The seed light C7 output from the first phase shift element 53 is input to the first beam splitter 52.

As described above, the first beam splitter 52 has a function of reflecting the seed light of the second polarization so that the seed light is directed to the second beam splitter 55. Therefore, the first beam splitter 52 reflects the seed light C7 of the second polarization toward the second beam splitter 55. The second beam splitter 55 has a function of reflecting the seed light of the second polarization toward the laser medium 3 and passing the seed light of the first polarization. Therefore, the second beam splitter 55 reflects the seed light C7 of the second polarization from the first beam splitter 52 so that the seed light C7 is directed to the laser medium 3. Here, the second beam splitter 55 reflects the seed light C7 toward the mirror 56. The mirror 56 reflects the seed light C7 from the second beam splitter 55 toward the mirror 57. The mirror 57 reflects the seed light C7 from the mirror 56 toward the laser medium 3.

The second phase shift element 58 has a function of applying a phase difference of a ¼ wavelength to a polarization component of light. The second phase shift element 58 is disposed between the mirror 57 and the laser medium 3, that is, between the second beam splitter 55 and the laser medium 3. Therefore, the second phase shift element 58 receives the seed light C7 from the second beam splitter 55 through the mirrors 56 and 57, applies a phase difference of a ¼ wavelength to a polarization component thereof, and outputs the resultant light as seed light C8. The seed light C8 output from the second phase shift element 58 is input to the laser medium 3. Here, the seed light C8 is incident at an incidence angle of 0° with respect to the first surface 3*a* of the laser medium 3.

The coat 4 reflects the seed light C8 incident on the laser medium 3 toward the mirror 57. The reflective surface of the coat 4 is orthogonal to the seed light C8 (the coat 4 is a 0° mirror with respect to the seed light C8). Therefore, the seed light C8 reflected by the coat 4 is directed to the second phase shift element 58, the mirrors 57 and 56, and the second beam splitter 55 in a reverse direction of an optical path from the mirror 57 to the coat 4. That is, the coat 4 and the mirrors 57 and 56 reflect the seed light C8 input to the laser medium 3 through the second phase shift element 58 so that the seed light C8 is directed to the second beam splitter 55 through the second phase shift element 58. Accordingly, the seed light C8 passes through the laser medium 3 (the excitation region R) twice and is amplified.

The second phase shift element 58 receives the amplified seed light C8 reflected by the coat 4, applies a phase difference of a ¼ wavelength to a polarization component thereof, and outputs the resultant as seed light C9. A polarization direction of the seed light C9 output from the second phase shift element 58 is rotated by 90° due to shift by a ½ wavelength of a phase of the polarization component, as compared with the seed light C7, and the seed light C9 gains first polarization. The seed light C9 output from the second phase shift element 58 is input to the second beam splitter 55 through the mirrors 56 and 57.

As described above, the second beam splitter 55 has a function of passing the seed light of the first polarization. Therefore, the second beam splitter 55 passes the seed light C9 from the mirror 57. The seed light C9 passing through the second beam splitter 55 is reflected by the mirrors 59 and 60, and then, taken out as output light. As described above, in the laser device 1, six paths passing through the laser medium 3 are also formed in the second-stage amplification mechanism, and the seed light is amplified six times.

Figure 4A:
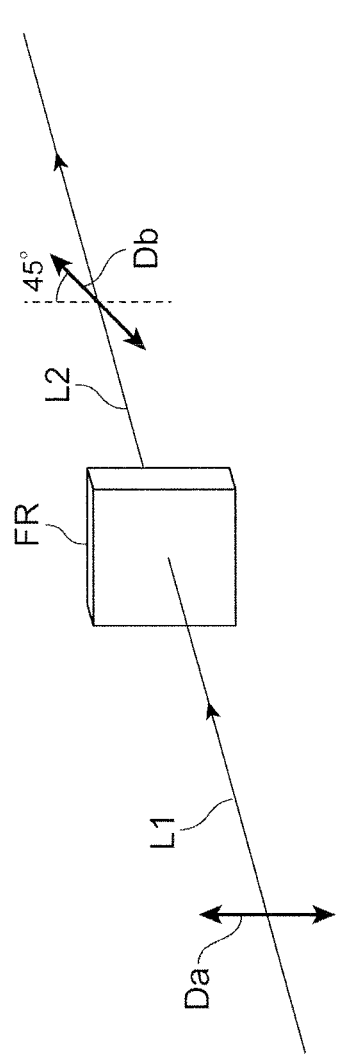
FIG. 4A is a diagram illustrating an example of a Faraday rotator.
Figure 4B:
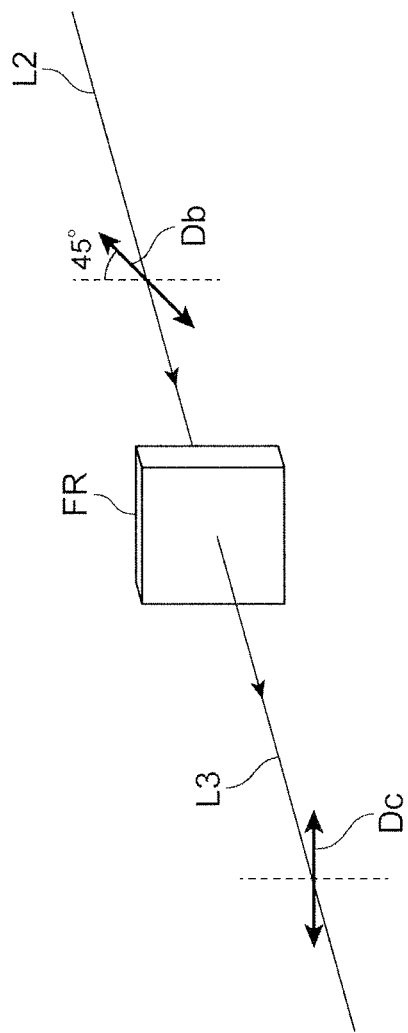
FIG. 4B is a diagram illustrating an example of a Faraday rotator.

Here, the laser device 1 may include a Faraday rotator that is a polarization rotation element, instead of the phase shift elements such as the first phase shift elements 27 and 53 and the second phase shift elements 31 and 58 described above. FIGS. 4A and 4B are diagrams illustrating an example of the Faraday rotator. The Faraday rotator is a polarization rotation element using a Faraday effect, which is a phenomenon in which a polarization of light traveling in a magnetic field rotates.

As illustrated in FIG. 4A, when the Faraday rotator FR receives light L1 of first polarization Da traveling in a first direction, the Faraday rotator FR rotates a polarization direction thereof by 45° and outputs light L2 of second polarization Db. Further, as illustrated in FIG. 4B, when the Faraday rotator FR receives the light L2 of second polarization Db traveling in a second direction opposite to the first direction, the Faraday rotator FR rotates a polarization direction thereof by 45° and outputs light L3 of third polarization Dc (polarization rotated by 90° from the first polarization Da).

Therefore, when the first phase shift elements 27 and 53 described above are replaced with a Faraday rotator, the Faraday rotator is disposed between the first beam splitters 26 and 52 and the laser medium 3, receives the seed lights C1 and C5 from the first beam splitters 26 and 52, rotates polarization directions thereof by 45°, and outputs the resultant lights as seed lights C2 and C6. Further, in this case, the Faraday rotator receives the amplified seed lights C2 and C6 reflected by the coat 4, rotates the polarization directions thereof by 45°, and outputs the resultant lights as the seed lights C3 and C7.

Furthermore, when the second phase shift elements 31 and 58 described above are replaced with a Faraday rotator, the Faraday rotator is disposed between the second beam splitters 29 and 55 and the laser medium 3, receives the seed lights C3 and C7 from the second beam splitters 29 and 55, rotates polarization directions thereof by 45°, and outputs the resultant lights as seed lights C4 and C8. Further, in this case, the Faraday rotator receives the amplified seed lights C4 and C8 reflected by the coat 4, rotates polarization direction thereof by 45°, and outputs the resultant lights as the seed light C5 and C9.

Further, the optical isolator such as the optical isolator 34 described above in the laser device 1 includes, for example, a Faraday isolator. Here, the optical isolator 34 is a Faraday isolator. FIGS. 5A and 5B are diagrams illustrating a Faraday isolator. As illustrated in FIGS. 5A and 5B, a Faraday isolator FI includes a Faraday rotator FR and polarization elements Pa and Pb. The polarization element Pa, the Faraday rotator FR, and the polarization element Pb are arranged in order in the first direction. The polarization element Pa passes only the light L1 of the first polarization Da. The polarization element Pb passes only the light L2 of the second polarization Db different by 45° from the first polarization 45.

Therefore, as illustrated in FIG. 5A, when the light L1 of the first polarization Da is input to the Faraday isolator FI from the first direction, the light L1 passes through the polarization element Pa and is input to the Faraday rotator FR. The polarization direction of the light L1 input to the Faraday rotator FR is rotated by 45° and output as the light L2 of the second polarization Db. The light L2 output from the Faraday rotator FR passes through the polarization element Pb and is output to the outside.

On the other hand, as illustrated in FIG. 5B, when the light L2 of the second polarization Db is input to the Faraday isolator FI from the second direction opposite to the first direction, the light L2 passes through the polarization element Pb and is input to the Faraday rotator FR. The polarization direction of the light L2 input to the Faraday rotator FR is further rotated by 45° and output as the light L3 of the third polarization Dc. The light L3 output from the Faraday rotator FR cannot pass through the polarization element Pa and is blocked by the polarization element Pa.

As described above, in the laser device 1, the seed light C1 that is an amplification target is input to the first beam splitter 26 in the first polarization. The seed light C1 of the first polarization passes through the first beam splitter 26 and is directed to the laser medium 3. The seed light C1 of the first polarization directed from the first beam splitter 26 to the laser medium 3 passes through the first phase shift element 27, such that a phase difference of a ¼ wavelength is applied to a polarization component thereof. The seed light C2 passing through the first phase shift element 27 is incident on the laser medium 3 at an incidence angle larger than 0°. The seed light C2 incident on the laser medium 3 is input to the excitation region R, amplified, reflected by the coat 4, amplified again, and then emitted from the laser medium 3. The seed light C2 emitted from the laser medium 3 is reflected by the mirror 28 and incident on the laser medium 3 again. The seed light C2 reflected by the mirror 28 and incident on the laser medium 3 is reflected again by the coat 4 and directed to the first beam splitter 26 through the first phase shift element 27.

In this case, the seed light C3 passes through the first phase shift element 27 again. Accordingly, a phase difference of a ¼ wavelength is further applied to the polarization component thereof, and the seed light C3 gains the second polarization (for example, S polarization). Therefore, the seed light C3 is reflected and split by the first beam splitter 26. The seed light C3 split by the first beam splitter 26, for example, may be guided to the laser medium 3 by another optical system (here, the third optical system 40) again and subjected to further amplification. Thus, in the laser device 1, both of separation of an amplification path according to a polarization direction by the first beam splitter 26 and the first phase shift element 27 and doubling of an amplification path by the coat 4 and the mirror 28 are achieved. As a result, it is possible to achieve high output by realizing a large number of amplifications with a simple configuration.

The laser device 1 further includes the third optical system 40 for causing the seed light C3 of the second polarization reflected by the first beam splitter 26 to be incident on the laser medium 3 and input to the excitation region R. The third optical system 40 includes the second beam splitter 29 that reflects the seed light C3 of the second polarization from the first beam splitter 26 so that the seed light C3 is directed to the laser medium 3 and passes the seed light C5 of the first polarization from the laser medium 3, the second phase shift element 31 that is disposed between the second beam splitter 29 and the laser medium 3 and applies a phase difference of a ¼ wavelength to the polarization component of the seed light C3, and the coat 4 that reflects the seed light C4 incident on the laser medium 3 through the second phase shift element 31 so that the seed light C4 is directed to the second beam splitter 29 through the second phase shift element 31.

Therefore, the seed light C3 split by the first beam splitter 26 is input to the second beam splitter 29. The seed light C3 of the second polarization input to the second beam splitter 29 is reflected by the second beam splitter 29 so that the seed light C3 is directed to the laser medium 3. The seed light C3 of the second polarization directed to the laser medium 3 from the second beam splitter 29 passes through the second phase shift element 31, such that a phase difference of a ¼ wavelength is applied to a polarization component thereof. The seed light C4 passing through the second phase shift element 31 is input to the excitation region R of the laser medium 3, is amplified, is reflected by the coat 4, is amplified again, passes through the second phase shift element 31 again, and then, is input to the second beam splitter 29.

In this time, the seed light c5 passes through the second phase shift element 31 again, such that a phase difference of a ¼ wavelength is further applied to the polarization component of the seed light c5, and the seed light c5 is caused to be first polarization. Therefore, the seed light C5 passes through the second beam splitter 29. As a result, the seed light C5 passing through the second beam splitter 29 is amplified at least six times and output. Thus, in the laser device 1, it is possible to achieve high output by realizing a larger number of amplifications with a simple configuration.

Further, in the laser device 1, the laser medium 3 includes the first surface 3a and the second surface 3b opposite to the first surface 3a. The first optical system 10 causes the excitation light E1 to be incident on the laser medium 3 from the first surface 3a side, and the second optical system 20 and the third optical system 40 cause the seed light to be incident on the laser medium 3 from the second surface 3b side. Therefore, the optical path of the excitation light E1 and the optical path of the seed light are distributed to both sides of the laser medium 3. Therefore, it is possible to design the optical system without considering interference of each optical path.

Further, in the laser device 1, the coat 4 that transmits the excitation light E1 and reflects the seed light is formed on the first surface 3a. The mirror reflecting the seed lights C2 and C4 includes a mirror constituted by the coat 4. Therefore, it is possible to achieve high output with a simpler configuration.

Further, the laser device 1 further includes the optical isolator 34 that is disposed between the first beam splitter 26 and the second beam splitter 29 and passes light in a direction directed from the first beam splitter 26 to the second beam splitter 29. Therefore, progress of the light in the direction directed from the second beam splitter 29 to the first beam splitter 26 is suppressed. As a result, unintended resonator configuration and stimulated radiation are avoided. It should be noted that, in the laser device 1, seed light reciprocates in paths from the first beam splitter 26 to the laser medium 3 and from the second beam splitter 29 to the laser medium 3. Therefore, as in this case, it is effective to interpose the optical isolator 34 between the first beam splitter 26 and the second beam splitter 29 in which the reciprocation of the seed light is not required.

Further, in the laser device 1, the laser medium 3 may include Yb as an active element. Thus, when the Yb-based laser medium 3 is used, it is necessary for the excitation light E1 and the seed light to be input to a narrower excitation region R for high intensity excitation, for example, as compared with a case in which a Nd-based laser medium is used. Therefore, importance of high-precision and easy alignment of the optical system is relatively higher. Therefore, it is more effective to realize a simple configuration using the laser device 1.

Furthermore, in the laser device 1, a Faraday rotator serving as a polarization rotation element may be used instead of the first phase shift element 27 and the second phase shift element 31. In this case, a variation in the polarization direction due to heat generated in the laser medium 3 can be compensated for.

In the above embodiment, an embodiment of the laser device according to the present disclosure has been described. Therefore, the laser device according to the present disclosure is not limited to the laser device 1 described above, and various modifications are possible.

For example, in the above embodiment, the Yb-based laser gain medium is illustrated as the laser medium 3. However, the laser medium 3 may be, for example, a laser medium including Nd as an active element (for example, Nd: YAG).

Further, an example in which the coat 4 provided on the first surface 3a of the laser medium 3 is used as the mirror that reflects the seed lights C2 and C4 has been shown in the above embodiment. On the other hand, a configuration in which the seed lights C2 and C4 are transmitted through the laser medium 3 may be adopted, and a separate mirror that reflects the seed lights C2 and C4 toward the first surface 3a may be provided at a position spaced from the first surface 3a.

Further, in the embodiment, although the laser device 1 includes the two-stage amplification mechanism, the laser device 1 may include a one-stage amplification mechanism or the laser device 1 may include a three-or-more-stage amplification mechanism. Furthermore, the laser device 1 may not include the light source 2.

The above embodiment will be additionally described below.

[Supplement 1]

A laser device including:

a laser medium for amplifying seed light;

a first optical system for outputting excitation light for exciting the laser medium and causing the excitation light to be incident on the laser medium and input to an excitation region of the laser medium; and a second optical system for causing the seed light of first polarization to be incident on the laser medium at an incidence angle larger than 0° with respect to the laser medium and input to the excitation region, wherein the second optical system includes a first beam splitter that passes the seed light of the first polarization so that the seed light is directed to the laser medium and reflects the seed light of second polarization different by 90° from the first polarization from the laser medium;

a first phase shift element that is disposed between the first beam splitter and the laser medium and applies a phase difference of a ¼ wavelength to a polarization component of the seed light;

a first mirror that reflects the seed light incident on the laser medium through the first phase shift element so that the seed light is emitted from the laser medium; and a second mirror that directs the seed light to the first beam splitter through the first phase shift element by causing the seed light to reflect again by the first mirror by reflecting the seed light so that the seed light returns to the first mirror through the laser medium.

[Supplement 2]

The laser device according to supplement 1, including:

a third optical system for causing the seed light of the second polarization reflected by the first beam splitter to be incident on the laser medium and input to the excitation region, wherein the third optical system includes a second beam splitter that reflects the seed light of the second polarization from the first beam splitter so that the seed light is directed to the laser medium, and passes the seed light of the first polarization from the laser medium;

a second phase shift element that is disposed between the second beam splitter and the laser medium and applies a phase difference of a ¼ wavelength to a polarization component of the seed light; and a third mirror that reflects the seed light incident on the laser medium through the second phase shift element so that the seed light is directed to the second beam splitter through the second phase shift element.

[Supplement 3]

The laser device according to supplement 2, wherein the laser medium includes a first surface, and a second surface opposite to the first surface, the first optical system causes the excitation light to be incident on the laser medium from the first surface side, and the second optical system and the third optical system cause the seed light to be incident on the laser medium from the second surface side.

[Supplement 4]

The laser device according to supplement 3, wherein a coat that transmits the excitation light and reflects the seed light is formed on the first surface, and the first mirror and the third mirror include a mirror constituted by the coat.

[Supplement 5]

The laser device according to any one of supplements 2 to 4, including:

an optical isolator that is disposed between the first beam splitter and the second beam splitter and passes light in a direction directed from the first beam splitter to the second beam splitter.

[Supplement 6]

The laser device according to supplement 5, wherein the optical isolator includes a Faraday isolator.

[Supplement 7]

The laser device according to any one of claims 1 to 8, wherein the laser medium includes Yb as an active element.

What is claimed is:

1. A laser device comprising:

a laser medium for amplifying seed light;

a first optical system for outputting excitation light for exciting the laser medium and causing the excitation light to be incident on the laser medium and input to an excitation region of the laser medium;

a second optical system for causing the seed light of first polarization to be incident on the laser medium at an incidence angle larger than 0° and input to the excitation region, wherein the second optical system includes a first beam splitter that passes the seed light of the first polarization so that the seed light is directed to the laser medium and reflects the seed light of second polarization different by 90° from the first polarization from the laser medium;

a first phase shift element that is disposed between the first beam splitter and the laser medium and applies a phase difference of a ¼ wavelength to a polarization component of the seed light;

a first mirror that reflects the seed light incident on the laser medium through the first phase shift element so that the seed light is emitted from the laser medium; and a second mirror that directs the seed light to the first beam splitter through the first phase shift element by causing the seed light to reflect again by the first mirror by reflecting the seed light so that the seed light returns to the first mirror through the laser medium; and a third optical system for causing the seed light of the second polarization reflected by the first beam splitter to be incident on the laser medium and input to the excitation region, wherein the third optical system includes a second beam splitter that reflects the seed light of the second polarization from the first beam splitter so that the seed light is directed to the laser medium, and passes the seed light of the first polarization from the laser medium;

a second phase shift element that is disposed between the second beam splitter and the laser medium and applies a phase difference of a ¼ wavelength to a polarization component of the seed light; and a third mirror that reflects the seed light incident on the laser medium through the second phase shift element so that the seed light is directed to the second beam splitter through the second phase shift element.

2. The laser device according to claim 1, comprising:
an optical isolator that is disposed between the first beam splitter and the second beam splitter and passes light in a direction directed from the first beam splitter to the second beam splitter.

3. The laser device according to claim 2, wherein the optical isolator includes a Faraday isolator.

4. The laser device according to claim 1,
wherein the laser medium includes a first surface, and a second surface opposite to the first surface,
the first optical system causes the excitation light to be incident on the laser medium from the first surface side, and
the second optical system causes the seed light to be incident on the laser medium from the second surface side.

5. The laser device according to claim 4,
wherein a coat that transmits the excitation light and reflects the seed light is formed on the first surface, and the first mirror includes a mirror constituted by the coat.

6. The laser device according to claim 1, wherein the laser medium includes Yb as an active element.

7. A laser device comprising:
a laser medium for amplifying seed light;
a first optical system for outputting excitation light for exciting the laser medium and causing the excitation light to be incident on the laser medium and input to an excitation region of the laser medium;
a second optical system for causing the seed light of first polarization to be incident on the laser medium at an incidence angle larger than 0° and input to the excitation region,
wherein the second optical system includes
a first beam splitter that passes the seed light of the first polarization so that the seed light is directed to the laser medium and reflects the seed light of second polarization different by 90° from the first polarization from the laser medium;
a first Faraday rotator that is disposed between the first beam splitter and the laser medium and rotates a polarization direction of the seed light by 45°;
a first mirror that reflects the seed light incident on the laser medium through the first Faraday rotator so that the seed light is emitted from the laser medium; and
a second mirror that directs the seed light to the first beam splitter through the first Faraday rotator by causing the seed light to reflect again by the first mirror by reflecting the seed light so that the seed light returns to the first mirror through the laser medium; and
a third optical system for causing the seed light of the second polarization reflected by the first beam splitter to be incident on the laser medium and input to the excitation region,
wherein the third optical system includes
a second beam splitter that reflects the seed light of the second polarization from the first beam splitter so that the seed light is directed to the laser medium, and passes the seed light of the first polarization from the laser medium;
a second Faraday rotator that is disposed between the second beam splitter and the laser medium and rotates a polarization direction of the seed light by 45°; and
a third mirror that reflects the seed light incident on the laser medium through the second Faraday rotator so that the seed light is directed to the second beam splitter through the second Faraday rotator.

* * * * *